US012739456B2

(12) United States Patent
Xing

(10) Patent No.: US 12,739,456 B2
(45) Date of Patent: Sep. 15, 2026

(54) VIDEO TRANSCODING TASK SCHEDULING

(71) Applicant: BEIJING BAIDU NETCOM SCIENCE TECHNOLOGY CO., LTD., Beijing (CN)

(72) Inventor: Huaifei Xing, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 17 days.

(21) Appl. No.: 18/990,124

(22) Filed: Dec. 20, 2024

(65) Prior Publication Data

US 2026/0136050 A1 May 14, 2026

(30) Foreign Application Priority Data

Aug. 6, 2024 (CN) ........................ 202411074649.8

(51) Int. Cl.
*H04N 21/24* (2011.01)
*H04N 21/231* (2011.01)

(52) U.S. Cl.
CPC ... *H04N 21/2405* (2013.01); *H04N 21/23103* (2013.01)

(58) Field of Classification Search
None
See application file for complete search history.

(56) References Cited

U.S. PATENT DOCUMENTS

2007/0094583 A1* 4/2007 Randall ................ H04N 19/154 375/E7.129
2007/0261092 A1* 11/2007 Ozawa .............. H04N 21/6437 348/E7.071
2009/0183218 A1* 7/2009 Li ...................... H04N 21/2405 725/114
2012/0191876 A1* 7/2012 Johnson .................. H04L 67/53 709/246
2012/0271948 A1* 10/2012 Martin .............. H04N 21/2405 709/226
2013/0117418 A1* 5/2013 Mutton .......... H04N 21/234309 709/219
2013/0282821 A1* 10/2013 Muriello ................ H04L 67/10 709/204

(Continued)

FOREIGN PATENT DOCUMENTS

CN 105162809 A * 12/2015 ......... H04L 67/1008
CN 114024973 A * 2/2022 ....... H04N 21/23805

*Primary Examiner* — William J Kim
(74) *Attorney, Agent, or Firm* — FisherBroyles, LLP

(57) ABSTRACT

A method is provided for scheduling a video transcoding task, and relates to the field of data processing technology, and in particular to artificial intelligence and streaming media technology. The implementation is: determining an input video to be transcoded, wherein the input video includes at least one image frame; performing an image analysis on the at least one image frame to obtain an image feature of the input video; determining target a transcoding parameter for a transcoded target video; predicting, based on the image feature of the input video and the target transcoding parameter, a resource occupancy required for a transcoding task for the input video and an acceptable memory usage for the transcoding task; scheduling a computational resource for the transcoding task based on the predicted resource occupancy and memory usage.

14 Claims, 3 Drawing Sheets

(56) References Cited

U.S. PATENT DOCUMENTS

2014/0267285 A1* 9/2014 Lee ................ H04N 21/440263
345/428
2020/0211172 A1* 7/2020 Nam ......................... G06T 5/70
2021/0152435 A1* 5/2021 Poteat ................. H04L 41/5022
2022/0358943 A1* 11/2022 So ........................ H04N 21/439

* cited by examiner

VIDEO TRANSCODING TASK SCHEDULING

CROSS REFERENCE TO RELATED APPLICATIONS

This application claims priority to Chinese Patent Application No. 202411074649.8, filed on Aug. 6, 2024, the contents of which are hereby incorporated by reference in their entirety for all purposes.

TECHNICAL FIELD

The present disclosure relates to the field of data processing technology, particularly to artificial intelligence and streaming media technology, and specifically to a method, an apparatus, an electronic device, a computer readable storage medium, and a computer program product for scheduling a video transcoding task.

BACKGROUND

Artificial intelligence is the discipline of the study of making computers simulate certain thinking processes and intelligent behaviors of a human being (such as learning, reasoning, thinking, planning, etc.), and there are both hardware-level and software-level technologies. The artificial intelligence hardware technologies generally include technologies such as sensors, special artificial intelligence chips, cloud computing, distributed storage, large data processing, etc.; The artificial intelligence software technologies mainly include computer vision technology, speech recognition technology, natural language processing technology and machine learning/deep learning, large data processing technology, knowledge graph technology and other major technological directions.

With the rapid development of the Internet, video distribution has become an important form of content distribution.

The methods described in this section are not necessarily methods that have been previously conceived or employed. Unless otherwise indicated, it should not be assumed that any method described in this section is considered to be the prior art only due to its inclusion in this section. Similarly, the problems mentioned in this section should not be assumed to be recognized in any prior art unless otherwise indicated.

SUMMARY

The present disclosure provides a method, an apparatus, an electronic device, a computer-readable storage medium, and a computer program product for scheduling a video transcoding task.

According to one aspect of the present disclosure, there is provided a method for scheduling a video transcoding task, comprising: determining an input video to be transcoded, wherein the input video comprises at least one image frame; performing an image analysis on the at least one image frame to obtain an image feature of the input video; determining a target transcoding parameter for a transcoded target video; predicting, based on the image feature of the input video and the target transcoding parameter, a resource occupancy required for a transcoding task of the input video and an acceptable memory usage for the transcoding task; scheduling a computational resource for the transcoding task based on the predicted resource occupancy and memory usage.

According to another aspect of the present disclosure, there is provided an apparatus for scheduling a video transcoding task, comprising: an input unit configured to determine an input video to be transcoded, wherein the input video comprises at least one image frame; a video analysis unit configured to perform an image analysis on the at least one image frame to obtain an image feature of the input video; a transcoding parameter determination unit configured to determine a target transcoding parameter for a transcoded target video; a prediction unit configured to predict, based on the image feature of the input video and the target transcoding parameter, a resource occupancy required for a transcoding task of the input video and an acceptable memory usage for the transcoding task; a scheduling unit configured to schedule a computational resource for the transcoding task based on the predicted resource occupancy and memory usage.

According to another aspect of the present disclosure, there is provided an electronic device, comprising: at least one processor; and a memory communicatively connected to the at least one processor; wherein the memory stores instructions executable by the at least one processor, and the instructions are executed by the at least one processor to enable the at least one processor to perform the methods according to the present disclosure.

According to another aspect of the present disclosure, there is provided a non-transient computer-readable storage medium storing computer instructions, wherein the computer instructions are used to enable the computer to perform the methods according to the present disclosure.

According to another aspect of the present disclosure, there is provided a computer program product, including a computer program, wherein the computer program implements the methods according to the present disclosure when executed by a processor.

It should be understood that the content described in this section is not intended to identify key or important features of the embodiments of the present disclosure, nor is it intended to limit the scope of the present disclosure. Other features of the present disclosure will become readily understood from the following description.

BRIEF DESCRIPTION OF THE DRAWINGS

The drawings exemplarily illustrate embodiments and constitute a part of the specification, and are used in conjunction with the textual description of the specification to explain the example implementations of the embodiments. The illustrated embodiments are for illustrative purposes only and do not limit the scope of the claims. Throughout the drawings, like reference numerals refer to similar but not necessarily identical elements.

DETAILED DESCRIPTION

The example embodiments of the present disclosure are described below in conjunction with the accompanying drawings, including various details of the embodiments of the present disclosure to facilitate understanding, and they should be considered as example only. Therefore, one of ordinary skill in the art will recognize that various changes and modifications may be made to the embodiments described herein without departing from the scope of the present disclosure. Similarly, descriptions of well-known functions and structures are omitted in the following description for the purpose of clarity and conciseness.

In the present disclosure, unless otherwise specified, the terms "first", "second" and the like are used to describe various elements and are not intended to limit the positional relationship, timing relationship, or importance relationship of these elements, and such terms are only used to distinguish one element from another. In some examples, the first element and the second element may refer to the same instance of the element, while in some cases they may also refer to different instances based on the description of the context.

The terminology used in the description of the various examples in this disclosure is for the purpose of describing particular examples only and is not intended to be limiting. Unless the context clearly indicates otherwise, if the number of elements is not specifically defined, the element may be one or more. In addition, the terms "and/or" used in the present disclosure encompass any one of the listed items and all possible combinations thereof.

The embodiments of the present disclosure will be described in detail below with reference to the accompanying drawings.

Figure 1:
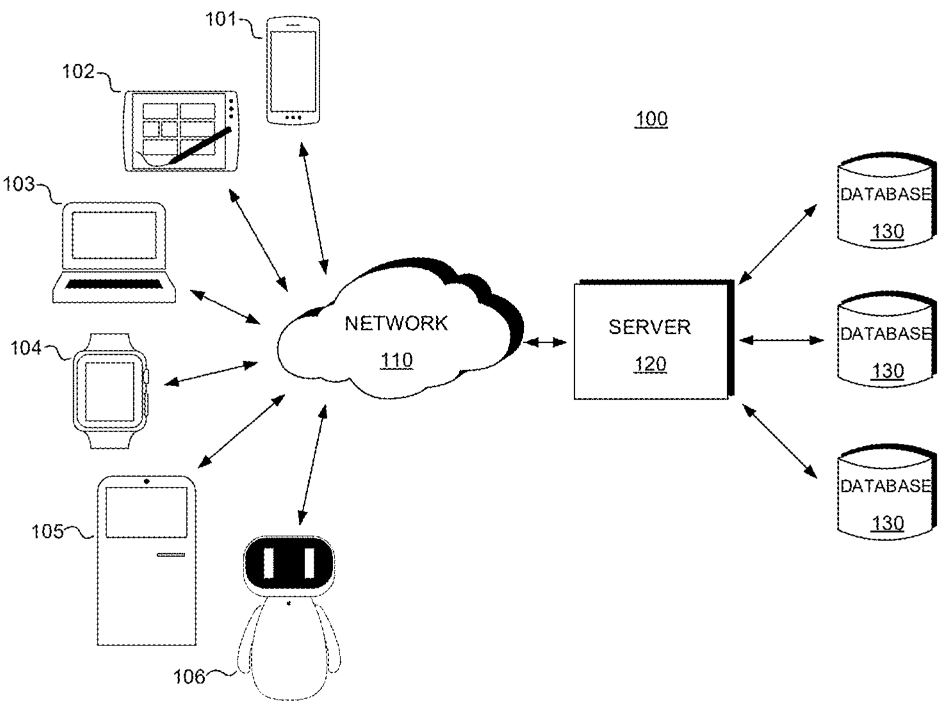
FIG. 1 illustrates is a schematic diagram illustrating an example system in which various methods described herein can be implemented according to an embodiment of the present disclosure.

FIG. 1 illustrates a schematic diagram of an example system 100 in which various methods and apparatuses described herein may be implemented in accordance with an embodiment of the present disclosure. Referring to FIG. 1, the system 100 includes one or more client devices 101, 102, 103, 104, 105, and 106, a server 120, and one or more communication networks 110 that couple one or more client devices to the server 120. The client devices 101, 102, 103, 104, 105, and 106 may be configured to execute one or more applications.

In an embodiment of the present disclosure, the server 120 may run one or more services or software applications that enable the execution of methods for scheduling a video transcoding task according to an embodiment of the present disclosure.

In some embodiments, the server 120 may also provide other services or software applications, which may include non-virtual environments and virtual environments. In some embodiments, these services may be provided as web-based services or cloud services, such as to a user of the client devices 101, 102, 103, 104, 105, and/or 106 under a Software as a Service (Saas) model.

In the configuration shown in FIG. 1, the server 120 may include one or more components that implement functions performed by the server 120. These components may include software components, hardware components, or a combination thereof that are executable by one or more processors. A user operating the client devices 101, 102, 103, 104, 105, and/or 106 may sequentially utilize one or more client applications to interact with the server 120 to utilize the services provided by these components. It should be understood that a variety of different system configurations are possible, which may be different from the system 100. Therefore, FIG. 1 is an example of a system for implementing the various methods described herein and is not intended to be limiting.

The user may use the client devices 101, 102, 103, 104, 105, and/or 106 to obtain input data for scheduling a video transcoding task, for example, inputting a video, specifying a transcoding parameter for a target video, etc. The client devices may provide an interface that enables the user of the client devices to interact with the client devices. The client devices may also output information to the user via the interface. Although FIG. 1 depicts only six client devices, those skilled in the art will be able to understand that the present disclosure may support any number of client devices.

The client devices 101, 102, 103, 104, 105, and/or 106 may include various types of computer devices, such as portable handheld devices, general-purpose computers, such as personal computers and laptop computers, workstation computers, wearable devices, smart screen devices, self-service terminal devices, service robots, gaming systems, thin clients, various messaging devices, sensors, or other sensing devices, and the like. These computer devices may run various types and versions of software applications and operating systems, such as Microsoft Windows, Apple IOS, Unix-like operating systems, Linux or Linux-like operating systems (e.g., Google Chrome OS); or include various mobile operating systems, such as Microsoft Windows Mobile OS, iOS, Windows Phone, Android. The portable handhold devices may include cellular telephones, smart phones, tablet computers, personal digital assistants (PDA), and the like. The wearable devices may include head-mounted displays, such as smart glasses, and other devices. The gaming systems may include various handhold gaming devices, Internet-enabled gaming devices, and the like. The client devices can perform various different applications, such as various applications related to the Internet, communication applications (e.g., e-mail applications), Short Message Service (SMS) applications, and may use various communication protocols.

The network 110 may be any type of network well known to those skilled in the art, which may support data communication using any of a variety of available protocols (including but not limited to TCP/IP, SNA, IPX, etc.). By way of example only, one or more networks 110 may be a local area network (LAN), an Ethernet-based network, a token ring, a wide area network (WAN), an Internet, a virtual network, a virtual private network (VPN), an intranet, an external network, a blockchain network, a public switched telephone network (PSTN), an infrared network, a wireless network (for example, Bluetooth, WIFI), and/or any combination of these and/or other networks.

The server 120 may include one or more general-purpose computers, a dedicated server computer (e.g., a PC (personal computer) server, a UNIX server, a mid-end server), a blade server, a mainframe computer, a server cluster, or any other suitable arrangement and/or combination. The server 120 may include one or more virtual machines running a virtual operating system, or other computing architectures involving virtualization (e.g., one or more flexible pools of a logical storage device that may be virtualized to maintain virtual storage devices of a server). In various embodiments, the server 120 may run one or more services or software applications that provide the functions described below.

The computing unit in the server 120 may run one or more operating systems including any of the operating systems described above and any commercially available server operating system. The server 120 may also run any of a variety of additional server applications and/or intermediate layer applications, including a HTTP server, an FTP server, a CGI server, a JAVA server, a database server, etc.

In some implementations, the server 120 may include one or more applications to analyze and merge data feeds and/or event updates received from the user of the client devices 101, 102, 103, 104, 105, and/or 106. The server 130 may also include one or more applications to display the data feeds and/or the ground truth-time events via one or more display devices of the client devices 101, 102, 103, 104, 105, and/or 106.

In some embodiments, the server 120 may be a server of a distributed system, or a server incorporating a block chain. The server 120 may also be a cloud server, or an intelligent cloud computing server or an intelligent cloud host with an artificial intelligence technology. The cloud server is a host product in a cloud computing service system to overcome the defects of management difficulty and weak service expandability exiting in a traditional physical host and virtual private server (VPS) service.

The system 100 may also include one or more databases 130. In certain embodiments, these databases may be used to store data and other information. For example, one or more of the databases 130 may be used to store information such as audio files and video files. The databases 130 may reside in various locations. For example, the database used by the server 120 may be local to the server 120, or may be remote to the server 120 and may communicate with the server 120 via a network-based or dedicated connection. The databases 130 may be of different types. In some embodiments, the database used by the server 120 may be, for example, a relational database. One or more of these databases may store, update, and retrieve data to and from the database in response to a command.

In some embodiments, one or more of the databases 130 may also be used by an application to store application data. The databases used by the application may be different types of databases, such as a key-value repository, an object repository, or a conventional repository supported by a file system.

The system 100 of FIG. 1 may be configured and operated in various ways to enable application of various methods and apparatuses described according to the present disclosure.

With rapid development of the Internet, video distribution has become an important form of content distribution. In a video distribution process, efficient transcoding is needed to ensure a smoothness of the video distribution. Especially for video distribution scenarios such as video live streaming, efficient transcoding and resource management are important. Traditional transcoding task scheduling methods usually depend on manual scheduling and rule-based scheduling. For example, by assigning a new video transcoding task to a server which is currently idle (e.g., the CPU occupancy is less than a threshold). No matter what kind of video content it is, for example, a simple stream or a complex stream, a same scheduling method is used to schedule the video content to an idle machine. It is difficult for such scheduling methods to cope with changeable network environments and video stream features, resulting in resource waste and system performance degradation.

However, it is not enough to consider only the load of CPU, because in the scenarios where the video is processed in real-time, the encoding frame rate should reach a real-time level, such as a constant 25 fps. For videos of different complexities, the computing power required to reach 25 fps is not the same. Therefore, the scheduling scheme in the current related art, on one hand, may cause stuttering of a single video stream (where a real-time capability cannot meet the requirement), and on the other hand, the scheduled resources are unbalanced, which may cause unbalanced use of the machine computing power.

In order to improve a resource scheduling efficiency of the video transcoding task, the present disclosure provides a new method for scheduling a video transcoding task.

Figure 2:
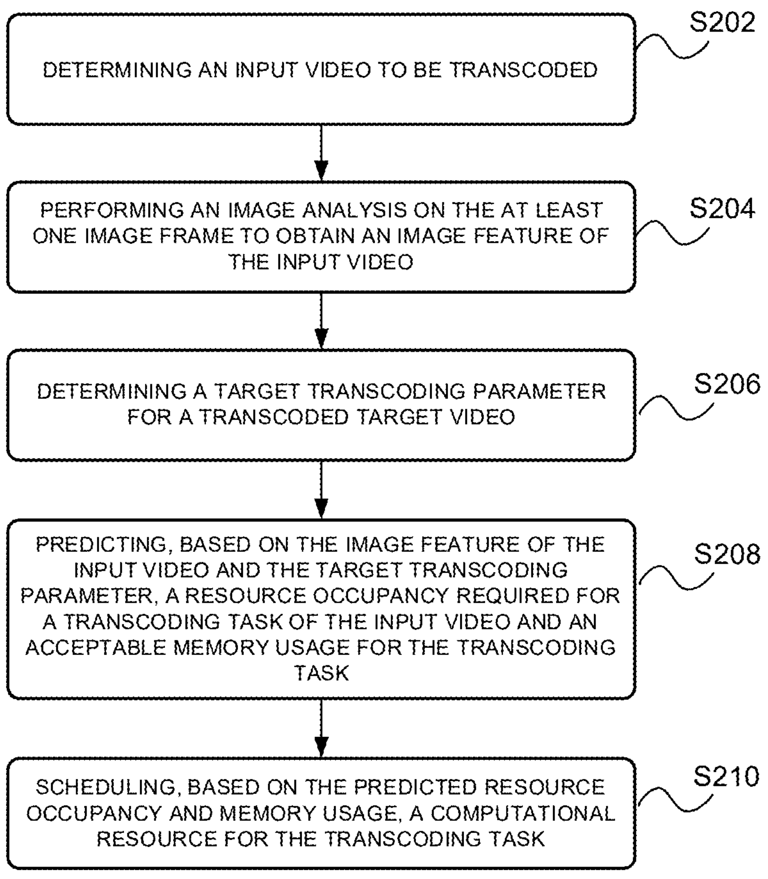
FIG. 2 illustrates a flowchart of a method for scheduling a video transcoding task according to an embodiment of the present disclosure.

FIG. 2 illustrates an example flowchart of a method for scheduling a video transcoding task according to an embodiment of the present disclosure.

In step S202, determining an input video to be transcoded, wherein the input video includes at least one image frame.

In step S204, performing an image analysis on the at least one image frame to obtain an image feature of the input video.

In step S206, determining a target transcoding parameter for a transcoded target video.

In step S208, predicting, based on the image feature of the input video and the target transcoding parameter, a resource occupancy required for a transcoding task of the input video and an acceptable memory usage for the transcoding task.

In step S210, scheduling a computational resource for the transcoding task based on the predicted resource occupancy and memory usage.

By using the method for scheduling a video transcoding task provided by an embodiment of the present disclosure, the computational resource required to perform a transcoding task can be predicted based on the image feature of an input video to be transcoded and the transcoding parameter, thereby enabling flexible scheduling of the transcoding task and improving the utilization rate of a server cluster for performing the transcoding task.

The principles of the present disclosure will be described in detail below.

In step S202, determining an input video to be transcoded, wherein the input video includes at least one image frame.

In some embodiments, the input video to be transcoded may be a live video. Due to high real-time requirements for video transmission in live streaming scenarios, the method for scheduling a video transcoding task provided by an embodiment of the present disclosure can effectively improve the utilization rate of the transcoding resource of the live stream video, thereby enabling the live stream video transmission to be smoother. It can be understood that without departing from the principles of the present disclosure, the methods provided by the embodiments of the present disclosure can also be used for video transcoding tasks in any other scenarios other than live streaming.

In step S204, performing an image analysis on the at least one image frame to obtain the image feature of the input video.

The image feature of the input video can be used to represent the content complexity of the input video. In an example, the image feature of the input video may include at least one of the following: a resolution, a bit rate, a group of pictures (GoP) size, a frame rate, an encoder type (e.g., the encoding format is H.265 or H.245), temporal complexity information (TI), and spatial complexity information (SI). The above image feature can be obtained by performing an image analysis on the image frames in the input video using any known video parsing method. Without departing from the principles of the present disclosure, any other parameter that can represent the content complexity of the input video can also be used as the image feature of the input video.

In step S206, determining a target transcoding parameter for a transcoded target video.

The target transcoding parameter of the target video can represent the encoding complexity of the target video, and thereby affecting the complexity of the transcoding task. For example, the higher the compression ratio of the target video, the less computational workload of the transcoding task. Conversely, the lower a compression rate of the target video, the more computational resources the transcoding task requires to accomplish the required computational workload.

In an example, the target transcoding parameter may include at least one of the following: a target resolution, a target bit rate, a target frame rate, and a target encoding level. Among these, the target encoding level may represent an encoding quality (e.g., the compression rate) of the target video. In an example, the target encoding level may be represented according to a transcoding speed, such as "fast", "medium", "slow". Among these, the faster the transcoding speed, the lower the encoding quality of the target video. The target transcoding parameter may be specified by the user or determined according to a rule before the transcoding task starts. Without departing from the principles of the present disclosure, any other parameter that can represent the encoding complexity of the target video may also be used as the target transcoding parameter of the target video.

In step S208, predicting, based on the image feature of the input video and the target transcoding parameter, a resource occupancy required for a transcoding task of the input video and an acceptable memory usage for the transcoding task. Among these, the resource occupancy may be the processor resources occupied for executing the transcoding task, such as the CPU utilization. The memory usage can be the maximum memory usage where the transcoding task does not stutter. Among these, the memory usage may include at least one of memory latency time, memory occupancy bandwidth, and the other parameters. The memory usage is another important factor which affects the transcoding task processing efficiency in addition to the CPU utilization rate. In some cases, even if the CPU usage has not reached the upper limit, if other tasks being processed have higher complexities, which causes higher memory usage, it will cause other abnormal phenomena such as stuttering of the other transcoding tasks.

In some embodiments, a trained machine learning model may be used to process the image feature of the input video and the target transcoding parameter, to output the resource occupancy and the memory usage. An example machine learning model may be a regression model (e.g., linear regression, random forest regression, etc.) or a classification model (e.g., convolutional neural network, random forest classification, etc.).

In some other embodiments, the image feature of the input video and the target transcoding parameter may be matched based on a predetermined rule to obtain the predicted resource occupancy and memory usage. In some further embodiments, a generative model, such as a large language model, may be used to process the image feature of the input video and the target transcoding parameter to obtain the predicted resource occupancy and memory usage. Without departing from the principles of embodiments of the present disclosure, various prediction algorithms may be utilized to predict the resource occupancy and memory usage of the transcoding task.

In the case of predicting the resource required for the transcoding task by means of a machine learning model, the machine learning model can be trained by the following method.

A sample dataset is determined, wherein the sample dataset includes a plurality of sample videos to be transcoded. For each sample video in the sample dataset, performing an image analysis on image frames in the sample video to determine a sample image feature of the sample video. A target transcoding parameter corresponding to the sample video is determined. The sample video is transcoded according to the target transcoding parameter. A ground truth resource occupancy required for the transcoding process of the sample video and an acceptable ground truth memory usage for the transcoding process are marked. The sample image feature is input into the machine learning model to obtain a predicted resource occupancy and predicted memory usage. A parameter of the machine learning model are adjusted based on a first difference between the predicted resource occupancy and the ground truth resource occupancy and a second difference between the predicted memory usage and the ground truth memory usage.

The sample dataset may include the sample video to be transcoded. Taking the application scenario as a live stream as an example, the sample video may be live stream video. The sample video may be analyzed to obtain the image feature of the sample video, such as the resolution, the bit rate, the GOP size, the frame rate, the encoder type, the TI information, the SI information, and the like. The above image feature(s) may be calculated in real time in the encoding process of the sample video. In an example, pre-processing, such as data cleaning, normalization, etc., may be performed on the sample video. In some cases, an average bit rate, an average GOP size, an average frame rates, etc., of the plurality of sample videos may be obtained as the image feature of the plurality of sample videos.

And then, the target transcoding parameter for transcoding the sample video may be determined, such as the encoding type, the resolution, the frame rate, the bit rate, the encoding level, etc., of the target video.

For a single sample video, transcoding tasks with different target transcoding parameters may be determined for the sample video.

For each transcoding task, a server may be utilized to execute the transcoding task and information such as CPU occupancy, memory usage, and the like of the server can be collected while executing the transcoding task. In an example, a plurality of identical transcoding tasks may be executed in parallel. Without running out of computational resources of the server, a number of the plurality of transcoding tasks, being executed in parallel to transcode the sample video based on the target transcoding parameter, may be increased until at least one of the plurality of transcoding tasks stutters. The resource occupancy and the memory usage of the plurality of transcoding tasks when the transcoding task of the sample video stutters may be marked. Among these, the ground truth resource occupancy for each transcoding task may be determined based on the resource occupancy of the plurality of transcoding tasks and the number of the plurality of transcoding tasks. For example, the resource occupancy of the plurality of transcoding tasks may be divided by the number of transcoding tasks to obtain the resource occupancy of each transcoding task. In addition, an acceptable ground truth memory usage for the transcoding process may be determined based on the server memory usage when a stutter occurs.

It can be understood, the memory usage of the server is related to an amount of memory reads and writes in the transcoding task, and encoding tasks of different complexities will generate different memory read and write requirements. Therefore, the memory usage acceptable for different transcoding tasks is different. Due to the differences between the encoding processes of different videos, it is difficult to determine, directly based on the video content, the maximum acceptable memory usage without causing stutter in the transcoding process.

Therefore, an embodiment of the present disclosure test specific acceptable memory usage for the transcoding tasks of different complexities by executing a plurality of identical transcoding tasks in parallel until a stutter occurs. It can be understood that as the number of tasks being executed in parallel continuously increases, the amount of memory reads and writes increases accordingly, and memory usage also increases accordingly. When a stutter occurs, it indicates that the transcoding task is no longer able to be executed smoothly at this moment. The memory usage recorded when the stutter occurs is the threshold of the ground truth memory usage that the transcoding task can accept.

The machine learning model can be trained by using the sample image feature of the sample video as well as the ground truth resource occupancy and the acceptable ground truth memory usage for the transcoding process labeled using the methods described above, such that the machine learning model has the ability to predict the computational resource required for the transcoding task.

The sample image feature of the sample video and the target transcoding parameter may be input into the machine learning model to obtain the predicted resource occupancy and the predicted memory usage output by the machine learning model. The predicted resource occupancy and the ground truth resource occupancy, labeled for the transcoding task corresponding to the target transcoding parameter, may be compared to obtain the first difference between the predicted resource occupancy and the ground truth resource occupancy. Similarly, the predicted memory usage and the acceptable ground truth memory usage for the transcoding process, labeled for the transcoding task corresponding to the target transcoding parameter, may be compared to obtain the second difference between the predicted memory usage and the ground truth memory usage. The first difference and the second difference may be minimized by adjusting the parameter(s) of the machine learning model, such that the trained machine learning model is able to predict the computational resource required for the transcoding task.

In step S210, scheduling a computational resource for the transcoding task based on the predicted resource occupancy and memory usage.

In some embodiments, a current processor utilization rate and a current memory usage of each server in the server cluster performing the video transcoding tasks may be obtained, and server(s) which can meet predetermined scheduling conditions may be determined from the server cluster by comparing the predicted resource occupancy with the current processor utilization rate, and the predicted memory usage with the current memory usage, respectively, for processing the transcoding task.

Among these, a server cluster may include a plurality of servers, each of which may be used to perform a transcoding task. A current status of each server in the server cluster, including the CPU utilization rate and the memory usage of the server, may be collected by means of system monitoring. When the computational resource need to be allocated for a transcoding task, the transcoding task can be scheduled by matching the predicted resource occupancy of the transcoding task with the current resource occupancy of the server, and matching the predicted memory usage of the transcoding task with the current memory usage of the server.

For the resource occupancy, it may be determined whether the following scheduling condition is met: whether the CPU utilization rate of the server does not exceed the upper limit of the CPU utilization after the current CPU utilization rate is added to the predicted resource occupancy of the transcoding task predicted in step S208. For the memory usage, it may be determined whether the following scheduling condition is met: whether the current memory usage of the server is less than the predicted acceptable memory usage of the transcoding task predicted in step S208. If both of the above scheduling conditions are met, the transcoding task may be assigned to the server. If either of the above two scheduling conditions is not met, it may be checked whether another server in the server cluster can met the above scheduling conditions. If there is no server in the server cluster that can meet both of the above two scheduling conditions, the server whose working status is closest to the above two scheduling conditions among all the servers can be selected as the server for processing the transcoding task.

When deploying the method for scheduling a transcoding task provided by embodiments of the present disclosure, a performance data of the server system, including the CPU utilization rate, the memory usage, a bandwidth usage, and a transcoding time, may be collected, and the transcoding machine can report in real time the current CPU cluster and memory latency. The prediction model trained using the above method can be deployed in a computing system, and the system resource occupancy for the video transcoding is predicted in real time by using an application programming interface API or batch processing. A scheduler in the system is responsible for scheduling the source video stream in the transcoding task to the corresponding cluster and transcoding it. The model performance may be continuously monitored and the model and data may be updated periodically.

By using the methods according to an embodiment of the present disclosure, characteristics of the video stream can be analyzed and predicted using a prediction model, e.g., a machine learning model, and a transcoding strategy and resource allocation can be adjusted in real time to optimize the system performance and to reduce the probability of stuttering of a live streaming system, and at the same time, to improve the transcoding resource utilization rate of the entire video system.

Figure 3:
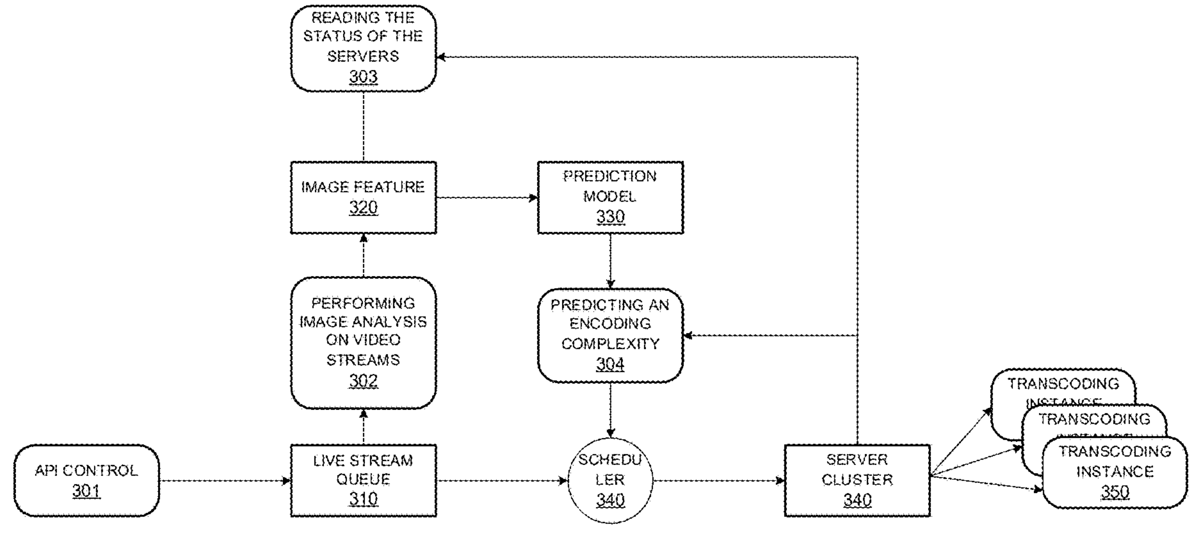
FIG. 3 illustrates an example process for scheduling a video transcoding task according to an embodiment of the present disclosure.

FIG. 3 illustrates an example process for scheduling a video transcoding task according to an embodiment of the present disclosure.

In step 301, an API controlled live stream queue 310 is used. Among these, a transcoding task may be scheduled to the queue 310 based on a service priority, with the transcoding task involving higher priority service being ranked higher in the queue.

In step 302, an image analysis may be performed on video streams in the live streaming queue 310 to obtain an image feature 320 of each video stream. In the example, the image feature 320 are normalized.

In step 303, a current status of the servers in the server cluster may be read, such as the CPU load data, memory usage data, and the like.

The prediction model 330 can be obtained by utilizing the image feature 320. In step 304, the prediction model 330 may be utilized to predict the encoding complexity of the transcoding task to be processed. For example, the prediction model 330 may be utilized to predict the resource occupancy required for the transcoding task and the acceptable memory usage for the transcoding task.

The scheduler 340 may assign, based on predicted results of the prediction model 330, the transcoding task in the live stream queue 310 to a server which meets the predetermined scheduling conditions in the server cluster 350 for transcoding.

In the operation process of the execution of each transcoding instance 360 of the server cluster 350, an operating status of each server in the cluster is monitored to provide the required information for the subsequent transcoding task scheduling.

Figure 4:
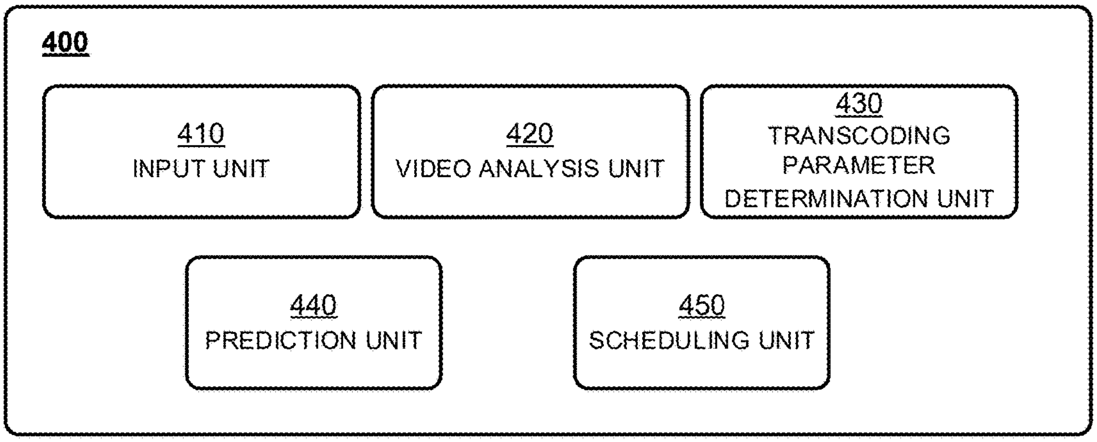
FIG. 4 illustrates an example block diagram of an apparatus for scheduling a video transcoding task according to an embodiment of the present disclosure.

FIG. 4 illustrates an example block diagram of an apparatus for scheduling a video transcoding task according to an embodiment of the present disclosure.

As shown in FIG. 4, the device 400 may include an input unit 410, a video analysis unit 420, a transcoding parameter determination unit 430, a prediction unit 440, and a scheduling unit 450.

The input unit 410 can be configured to determine an input video to be transcoded, wherein the input video includes at least one image frame.

The video analysis unit 420 can be configured to perform an image analysis on the at least one image frame to obtain the image feature of the input video.

The transcoding parameter determination unit 430 can be configured to determine the target transcoding parameter for a transcoded target video.

The prediction unit 440 can be configured to predict, based on the image feature of the input video and the target transcoding parameter, a resource occupancy required for a transcoding task of the input video and an acceptable memory usage for the transcoding task.

The scheduling unit 450 can be configured to schedule the computational resource for the transcoding task based on the predicted resource occupancy and memory usage.

It can be understood that the various modules or units of the device 400 shown in FIG. 4 may correspond to the various steps in the method 200 described with reference to FIG. 2. Thus, the operations, features and advantages described above for method 200 apply equally to device 400 and as well as the modules and units included therein. For the sake of brevity, certain operations, features and advantages are not repeated herein.

Although specific functionalities are discussed above with reference to specific modules, it should be noted that the functionalities of each unit discussed herein may be divided into multiple units, and/or at least some of the functionalities of the multiple units may be combined into a single unit.

It should also be understood that various techniques may be described herein in the general context of software hardware components or program modules. The various units described above with respect to FIG. 4 may be implemented in hardware or in hardware that combines software and/or firmware. For example, these units may be implemented as computer program code/instructions, which are configured to be executed in one or more processors and stored in a computer readable storage medium. Alternatively, these units may be implemented as hardware logic/circuitry. For example, in some embodiments, one or more of the units 410 to 450 may be implemented together in a System on Chip (SoC). The SoC may include an integrated circuit chip (which includes a processor (e.g., a Central Processing Unit (CPU), a microcontroller, a microprocessor, a digital signal processor (DSP), etc.), a memory, one or more communication interfaces, and/or one or more components of other circuitry), and may optionally execute received program code and/or include embedded firmware to perform functions.

According to another aspect of the present disclosure, there is provided an electronic device, comprising: at least one processor; and a memory communicatively connected to the at least one processor; wherein the memory stores instructions executable by the at least one processor, and the instructions are executed by the at least one processor to enable the at least one processor to perform the methods according to an embodiment of the present disclosure.

According to another aspect of the present disclosure, there is provided a non-transient computer-readable storage medium storing computer instructions, wherein the computer instructions are used to enable the computer to perform the methods according to an embodiment of the present disclosure.

According to another aspect of the present disclosure, there is provided a computer program product, including a computer program, wherein the computer program implements the methods according to an embodiment of the present disclosure when executed by a processor.

In the technical solutions of the present disclosure, the collection, storage, usage, processing, transmission, provision and disclosure of personal user information, etc., are in compliance with relevant laws and regulations and do not violate public order and morals.

With reference to FIG. 7, a structural block diagram of an electronic device 700 that may serve as a server or client of the present disclosure will now be described, which may be an example of a hardware device that may be applied to various aspects of the present disclosure. The electronic device is intended to represent various forms of digital electronic computer devices, such as, laptops, desktop computers, workstations, personal digital assistants, servers, blade servers, mainframe computers, and other suitable computers. The electronic device may also denote various forms of mobile devices such as, personal digital assistants, cellular phones, smart phones, wearable devices, and other similar computing devices. The components shown herein, their connections and relationships, and their functionality are shown as examples only and are not intended to limit the implementations of the present disclosure described and/or claimed herein.

Figure 5:
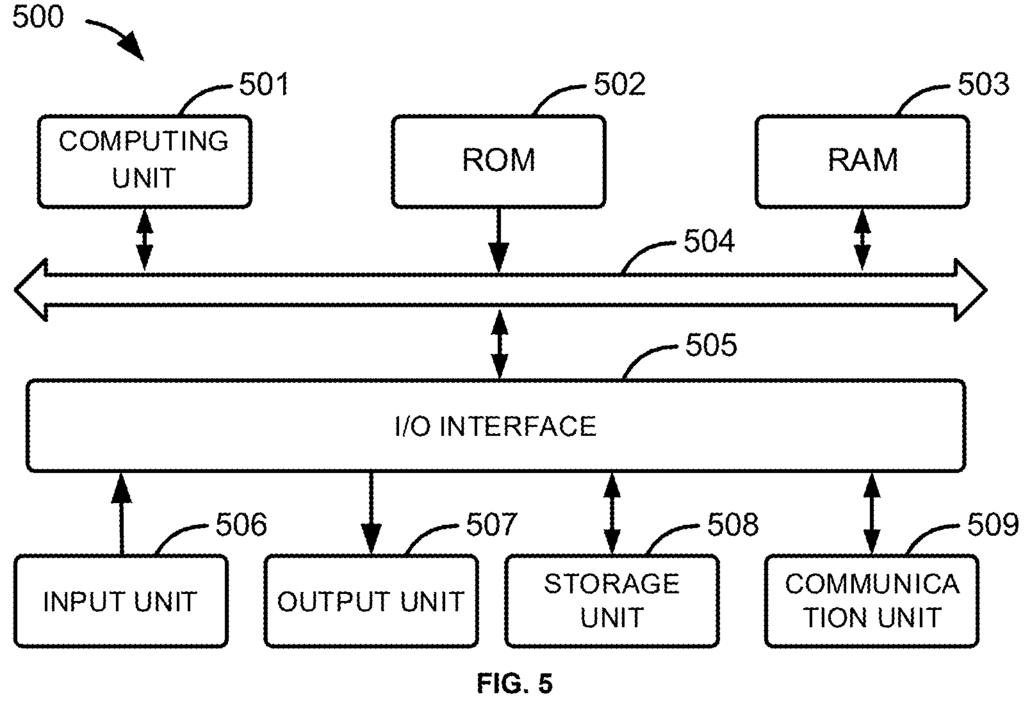
FIG. 5 illustrates a structural block diagram of an example electronic device that can be used to implement an embodiment of the present disclosure.

As shown in FIG. 5, the electronic device 500 includes a computing unit 501, which may perform various appropriate actions and processing according to a computer program stored in a read-only memory (ROM) 502 or a computer program loaded into a random access memory (RAM) 503 from a storage unit 508. In the RAM 503, various programs and data required by the operation of the electronic device 500 may also be stored. The computing unit 501, the ROM 502, and the RAM 503 are connected to each other through a bus 504. Input/output (I/O) interface 505 is also connected to the bus 504.

A plurality of components in the electronic device 500 are connected to a I/O interface 505, including: an input unit 506, an output unit 507, a storage unit 508, and a communication unit 509. The input unit 506 may be any type of device capable of inputting information to the electronic device 500, the input unit 506 may receive input digital or character information and generate a key signal input related to user setting and/or function control of the electronic device, and may include, but is not limited to, a mouse, a keyboard, a touch screen, a track pad, a trackball, a joystick, a microphone, and/or a remote control. The output unit 507 may be any type of device capable of presenting information, and may include, but are not limited to, a display, a speaker, a video/audio output terminal, a vibrator, and/or a printer. The storage unit 508 may include, but is not limited to, a magnetic disk and an optical disk. The communication unit 509 allows the electronic device 500 to exchange information/data with other devices over a computer network, such as the Internet, and/or various telecommunication networks, and may include, but is not limited to, a modem, a network card, an infrared communication device, a wireless communication transceiver and/or a chipset, such as a Bluetooth device, a 802.11 device, a WiFi device, a WiMAX device, a cellular communication device, and/or the like.

The computing unit 501 may be a variety of general and/or special purpose processing components with processing and computing capabilities. Some examples of the computing unit 501 include, but are not limited to, a central processing unit (CPU), a graphic processing unit (GPU), various dedicated artificial intelligence (AI) computing chips, various computing units running machine learning model algorithms, a digital signal processor (DSP), and any suitable processor, controller, microcontroller, etc. The computing unit 501 performs the various methods and processes described above, for example, the method 200. For example, in some embodiments, the method 200 may be implemented as a computer software program tangibly contained in a machine-readable medium, such as the storage unit 508. In some embodiments, part or all of the computer program may be loaded and/or installed onto the electronic device 500 via the ROM 502 and/or the communication unit 509. When the computer program is loaded to the RAM 503 and executed by the computing unit 501, one or more steps of the method 200 described above may be performed. Alternatively, in other embodiments, the computing unit 501 may be configured to perform the method 200 by any other suitable means (e.g., with the aid of firmware).

Various embodiments of the systems and techniques described above herein may be implemented in a digital electronic circuit system, an integrated circuit system, a field programmable gate array (FPGA), an application specific integrated circuit (ASIC), a dedicated standard product (ASSP), a system of system on a chip system (SoC), a complex programmable logic device (CPLD), computer hardware, firmware, software, and/or combinations thereof. These various embodiments may include: implementation in one or more computer programs that may be executed and/or interpreted on a programmable system including at least one programmable processor, where the programmable processor may be a dedicated or universal programmable processor that may receive data and instructions from a storage system, at least one input device, and at least one output device, and transmit data and instructions to the storage system, the at least one input device, and the at least one output device.

The program code for implementing the method of the present disclosure may be written in any combination of one or more programming languages. These program code may be provided to a processor or controller of a general-purpose computer, a special purpose computer, or other programmable data processing device such that the program code, when executed by the processor or controller, causes the functions/operations specified in the flowchart and/or block diagram to be implemented. The program code may be executed entirely on the machine, partly on the machine, partly on the machine as a stand-alone software package and partly on the remote machine or entirely on the remote machine or server.

In the context of the present disclosure, a machine-readable medium may be a tangible medium, which may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of a machine-readable storage media may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the foregoing.

To provide interaction with a user, the systems and techniques described herein may be implemented on a computer having: a display device (e.g., a CRT (cathode ray tube) or an LCD (liquid crystal display) monitor) for displaying information to a user; and a keyboard and pointing device (e.g., a mouse or trackball) by which a user may provide input to the computer. Other types of devices may also be used to provide interaction with a user; for example, the feedback provided to the user may be any form of perception feedback (e.g., visual feedback, auditory feedback, or tactile feedback); and the input from the user may be received in any form, including acoustic input, voice input, or haptic input.

The systems and techniques described herein may be implemented in a computing system including a back-end component (e.g., as a data server), or a computing system including a middleware component (e.g., an application server), or a computing system including a front-end component (e.g., a user computer with a graphic user interface or a web browser, the user may interact with implementations of the systems and techniques described herein through the graphic user interface or the web browser), or in a computing system including any combination of such back-end components, middleware components, or front-end components. The components of the system may be interconnected by digital data communication (e.g., a communications network) in any form or medium. Examples of communication networks include a local area network (LAN), a wide area network (WAN), the Internet and a blockchain network.

The computer system may include a client and a server. Clients and servers are generally remote from each other and typically interact through a communication network. The relationship between clients and servers is generated by computer programs running on respective computers and having a client-server relationship to each other. The server may be a cloud server, or may be a server of a distributed system, or a server incorporating a block chain.

It should be understood that the various forms of processes shown above may be used, and the steps may be reordered, added, or deleted. For example, the steps described in the present disclosure may be performed in parallel or sequentially or in a different order, as long as the results expected by the technical solutions disclosed in the present disclosure can be achieved, and no limitation is made herein.

Although embodiments or examples of the present disclosure have been described with reference to the accompanying drawings, it should be understood that the foregoing methods, systems, and devices are merely embodiments or examples, and the scope of the present disclosure is not limited by these embodiments or examples, but is only defined by the authorized claims and their equivalents. Various elements in the embodiments or examples may be omitted or may be replaced by equivalent elements thereof. Further, the steps may be performed in an order different from that described in the present disclosure. Further, various elements in the embodiments or examples may be combined in various ways. Importantly, with the evolution of the technology, many elements described herein may be replaced by equivalent elements appearing after the present disclosure.

What is claimed is:

1. A method for scheduling a video transcoding task, comprising:

determining an input video to be transcoded, wherein the input video comprises at least one image frame;

performing an image analysis on the at least one image frame to obtain an image feature of the input video;

determining a target transcoding parameter for a transcoded target video;

predicting, based on the image feature of the input video and the target transcoding parameter, a resource occupancy required for a transcoding task of the input video and an acceptable memory usage for the transcoding task, wherein the acceptable memory usage for the transcoding task is a maximum memory usage without stuttering during the transcoding task;

scheduling, based on the predicted resource occupancy and memory usage, a computational resource for the transcoding task, wherein predicting, based on the image feature of the input video and the target transcoding parameter, the resource occupancy and the memory usage comprises:

processing the image feature of the input video and the target transcoding parameter using a trained machine learning model to output the resource occupancy and the memory usage, wherein the input video to be transcoded is a live stream video, and the machine learning model is a regression model or a classification model, wherein the machine learning model is trained by:

determining a sample dataset, wherein the sample dataset comprises a plurality of sample videos to be transcoded;

for each sample video in the sample dataset, performing an image analysis on an image frame in the sample video to determine a sample image feature of the sample video;

determining a target transcoding parameter corresponding to the sample video;

transcoding the sample video according to the target transcoding parameter;

marking a ground truth resource occupancy required for a transcoding process of the sample video and an acceptable ground truth memory usage for the transcoding process, wherein the acceptable ground truth memory usage for the transcoding task is a maximum ground truth memory usage without stuttering during the transcoding task;

inputting the sample image feature into the machine learning model to obtain a predicted resource occupancy and a predicted memory usage;

adjusting a parameter of the machine learning model based on a first difference between the predicted resource occupancy and the ground truth resource occupancy and a second difference between the predicted memory usage and the ground truth memory usage.

2. The method of claim 1, wherein the image feature of the input video comprises at least one of:

a resolution;

a bit rate;

a group of pictures size;

a frame rate;

an encoder type;

temporal complexity information;

spatial complexity information.

3. The method of claim 1, wherein the target transcoding parameter comprises at least one of:

a target resolution, a target bit rate, a target frame rate, and a target encoding level.

4. The method of claim 1, wherein scheduling, based on the predicted resource occupancy and memory usage, the computational resource for the transcoding task comprises:

obtaining a current processor utilization rate and a current memory usage of each server of a server cluster which performs the video transcoding task;

determining, by comparing the predicted resource occupancy with the current processor utilization rate and the predicted memory usage and the current memory usage respectively, a server which meets a predetermined scheduling condition from the server cluster for processing the transcoding task.

5. The method of claim 1, wherein marking the ground truth resource occupancy required for the transcoding process of the sample video and the acceptable ground truth memory usage for the transcoding process comprises:

increasing a number of a plurality of transcoding tasks being executed in parallel to transcode the sample video based on the target transcoding parameter, until at least one of the plurality of transcoding tasks stutters;

marking a resource occupancy and a memory usage of the plurality of transcoding tasks when the transcoding task of the sample video stutters;

determining the ground truth resource occupancy of each transcoding task based on the resource occupancy of the plurality of transcoding tasks and the number of the plurality of transcoding tasks;

determining the ground truth memory usage based on a server memory usage when the transcoding task stutters.

6. An electronic device, comprising:

at least one processor; and a memory communicatively connected to the at least one processor; wherein the memory stores instructions executable by the at least one processor, and the instructions are executed by the at least one processor to enable the at least one processor to perform operations of:

determining an input video to be transcoded, wherein the input video comprises at least one image frame;

performing an image analysis on the at least one image frame to obtain an image feature of the input video;

determining a target transcoding parameter for a transcoded target video;

predicting, based on the image feature of the input video and the target transcoding parameter, a resource occupancy required for a transcoding task of the input video and an acceptable memory usage for the transcoding task, wherein the acceptable memory usage for the transcoding task is a maximum memory usage without stuttering during the transcoding task;

scheduling, based on the predicted resource occupancy and memory usage, a computational resource for the transcoding task, wherein predicting, based on the image feature of the input video and the target transcoding parameter, the resource occupancy and the memory usage comprises:

processing the image feature of the input video and the target transcoding parameter using a trained machine learning model to output the resource occupancy and the memory usage, wherein the input video to be transcoded is a live stream video, and the machine learning model is a regression model or a classification model, wherein the machine learning model is trained by:

determining a sample dataset, wherein the sample dataset comprises a plurality of sample videos to be transcoded;

for each sample video in the sample dataset, performing an image analysis on an image frame in the sample video to determine a sample image feature of the sample video;

determining a target transcoding parameter corresponding to the sample video;

transcoding the sample video according to the target transcoding parameter;

marking a ground truth resource occupancy required for a transcoding process of the sample video and an acceptable ground truth memory usage for the transcoding process, wherein the acceptable ground truth memory usage for the transcoding task is a maximum ground truth memory usage without stuttering during the transcoding task;

inputting the sample image feature into the machine learning model to obtain a predicted resource occupancy and a predicted memory usage;

adjusting a parameter of the machine learning model based on a first difference between the predicted resource occupancy and the ground truth resource occupancy and a second difference between the predicted memory usage and the ground truth memory usage.

7. The electronic device of claim 6, wherein the image feature of the input video comprises at least one of:

a resolution;

a bit rate;

a group of pictures size;

a frame rate;

an encoder type;

temporal complexity information;

spatial complexity information.

8. The electronic device of claim 6, wherein the target transcoding parameter comprises at least one of:

a target resolution, a target bit rate, a target frame rate, and a target encoding level.

9. The electronic device of claim 6, wherein scheduling, based on the predicted resource occupancy and memory usage, the computational resource for the transcoding task comprises:

obtaining a current processor utilization rate and a current memory usage of each server of a server cluster which performs the video transcoding task;

determining, by comparing the predicted resource occupancy with the current processor utilization rate and the predicted memory usage and the current memory usage respectively, a server which meets a predetermined scheduling condition from the server cluster for processing the transcoding task.

10. The electronic device of claim 6, wherein marking the ground truth resource occupancy required for the transcoding process of the sample video and the acceptable ground truth memory usage for the transcoding process comprises:

increasing a number of a plurality of transcoding tasks being executed in parallel to transcode the sample video based on the target transcoding parameter, until at least one of the plurality of transcoding tasks stutters;

marking a resource occupancy and a memory usage of the plurality of transcoding tasks when the transcoding task of the sample video stutters;

determining the ground truth resource occupancy of each transcoding task based on the resource occupancy of the plurality of transcoding tasks and the number of the plurality of transcoding tasks;

determining the ground truth memory usage based on a server memory usage when the transcoding task stutters.

11. A non-transient computer-readable storage medium storing computer instructions, wherein the computer instructions are used to enable the computer to perform operations of:

determining an input video to be transcoded, wherein the input video comprises at least one image frame;

performing an image analysis on the at least one image frame to obtain an image feature of the input video;

determining a target transcoding parameter for a transcoded target video;

predicting, based on the image feature of the input video and the target transcoding parameter, a resource occupancy required for a transcoding task of the input video and an acceptable memory usage for the transcoding task, wherein the acceptable memory usage for the transcoding task is a maximum memory usage without stuttering during the transcoding task;

scheduling, based on the predicted resource occupancy and memory usage, a computational resource for the transcoding task, wherein predicting, based on the image feature of the input video and the target transcoding parameter, the resource occupancy and the memory usage comprises:

processing the image feature of the input video and the target transcoding parameter using a trained machine learning model to output the resource occupancy and the memory usage, wherein the input video to be transcoded is a live stream video, and the machine learning model is a regression model or a classification model, wherein the machine learning model is trained by:

determining a sample dataset, wherein the sample dataset comprises a plurality of sample videos to be transcoded;

for each sample video in the sample dataset, performing an image analysis on an image frame in the sample video to determine a sample image feature of the sample video;

determining a target transcoding parameter corresponding to the sample video;

transcoding the sample video according to the target transcoding parameter;

marking a ground truth resource occupancy required for a transcoding process of the sample video and an acceptable ground truth memory usage for the transcoding process, wherein the acceptable ground truth memory usage for the transcoding task is a maximum ground truth memory usage without stuttering during the transcoding task;

inputting the sample image feature into the machine learning model to obtain a predicted resource occupancy and a predicted memory usage;

adjusting a parameter of the machine learning model based on a first difference between the predicted resource occupancy and the ground truth resource occupancy and a second difference between the predicted memory usage and the ground truth memory usage.

12. The non-transient computer-readable storage medium of claim 11, wherein the image feature of the input video comprises at least one of:

a resolution;

a bit rate;

a group of pictures size;

a frame rate;

an encoder type;

temporal complexity information;

spatial complexity information.

13. The non-transient computer-readable storage medium of claim 11, wherein the target transcoding parameter comprises at least one of:

a target resolution, a target bit rate, a target frame rate, and a target encoding level.

14. The non-transient computer-readable storage medium of claim 11, wherein scheduling, based on the predicted resource occupancy and memory usage, the computational resource for the transcoding task comprises:

obtaining a current processor utilization rate and a current memory usage of each server of a server cluster which performs the video transcoding task;

determining, by comparing the predicted resource occupancy with the current processor utilization rate and the predicted memory usage and the current memory usage respectively, a server which meets a predetermined scheduling condition from the server cluster for processing the transcoding task.

* * * * *